US012671204B2

(12) United States Patent
Nishitani

(10) Patent No.: US 12,671,204 B2
(45) Date of Patent: Jun. 30, 2026

(54) CONNECTOR WITH LOCKING LANCE FOR RETAINING TERMINAL FITTING

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Akihiro Nishitani, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 303 days.

(21) Appl. No.: 18/562,313

(22) PCT Filed: May 16, 2022

(86) PCT No.: PCT/JP2022/020329
§ 371 (c)(1),
(2) Date: Nov. 19, 2023

(87) PCT Pub. No.: WO2022/255070
PCT Pub. Date: Dec. 8, 2022

(65) Prior Publication Data

US 2024/0243505 A1 Jul. 18, 2024

(30) Foreign Application Priority Data

Jun. 2, 2021 (JP) ................................ 2021-092825

(51) Int. Cl.
*H01R 13/432* (2006.01)

(52) U.S. Cl.
CPC ................................ *H01R 13/432* (2013.01)

(58) Field of Classification Search
CPC ... H01R 13/432; H01R 13/4223; H01R 13/42
See application file for complete search history.

(56) References Cited

U.S. PATENT DOCUMENTS

2014/0305691 A1* 10/2014 Nishio .................. H01R 12/75 174/541
2014/0370757 A1* 12/2014 Endo ..................... H01R 43/20 29/729

(Continued)

FOREIGN PATENT DOCUMENTS

JP H02-110186 U1 9/1990
JP 2003-243079 A 8/2003

(Continued)

OTHER PUBLICATIONS

International Search Report issued on Aug. 2, 2022 for WO 2022/255070 A1 (4 pages).

*Primary Examiner* — Abdullah A Riyami
*Assistant Examiner* — Nader J Alhawamdeh
(74) *Attorney, Agent, or Firm* — Venjuris, P.C.

(57) ABSTRACT

It is aimed to improve the stiffness of a locking lance and prevent the deformation of the locking lance. A connector is provided with a housing (10) including a terminal accommodation chamber (11), a terminal fitting (30) to be inserted into the terminal accommodation chamber (11) from behind the housing (10), and a locking lance (20) arranged to face the terminal accommodation chamber (11) and retain the terminal fitting (30) in the terminal accommodation chamber (11). Both front and rear end parts of the locking lance (20) are connected to the housing (10). A front end supporting (Continued)

portion (17) for supporting the front end part of the locking lance (20) is located forward of a foremost end (20F) of the locking lance (20).

6 Claims, 5 Drawing Sheets

(56) References Cited

U.S. PATENT DOCUMENTS

| | | | | |
|---|---|---|---|---|
| 2019/0044270 | A1* | 2/2019 | Miyamura | H01R 13/422 |
| 2019/0199028 | A1* | 6/2019 | Maesoba | H01R 13/113 |
| 2019/0305461 | A1* | 10/2019 | Miyamura | H01R 13/4361 |
| 2020/0313334 | A1* | 10/2020 | Miyamura | H01R 13/506 |
| 2024/0243505 | A1* | 7/2024 | Nishitani | H01R 13/4223 |

FOREIGN PATENT DOCUMENTS

| | | | |
|---|---|---|---|
| JP | 2005-158416 | A | 6/2005 |
| JP | 2012-049081 | A | 3/2012 |

* cited by examiner

CONNECTOR WITH LOCKING LANCE FOR RETAINING TERMINAL FITTING

CROSS REFERENCE TO RELATED APPLICATIONS

This application is a national phase of PCT application No. PCT/JP2022/020329, filed on 16 May 2022, which claims priority from Japanese patent application No. 2021-092825, filed on 2 Jun. 2021, all of which are incorporated herein by reference.

TECHNICAL FIELD

The present disclosure relates to a connector.

BACKGROUND

Patent Document 1 discloses a connector configured such that a terminal fitting inserted into a terminal accommodation chamber of a housing is retained by the locking action of a locking lance.

PRIOR ART DOCUMENT

Patent Document

Patent Document 1: JP 2012-049081 A

SUMMARY OF THE INVENTION

Problems to be Solved

Since the locking lance has a shape cantilevered forward, stiffness is low. In the case of reducing the size of the housing, there is a concern that the stiffness of the locking lance is further reduced and the locking lance is easily disengaged from the terminal fitting. Further, a front end part of the locking lance is located to face an opening in the front surface of the housing. Thus, when an external matter intrudes from the front of the housing and interferes with the locking lance, there is a concern that the locking lance is deformed.

A connector of the present disclosure was completed on the basis of the above situation and aims to improve the stiffness of a locking lance and prevent the deformation of the locking lance.

Means to Solve the Problem

The present disclosure is directed to a connector with a housing including a terminal accommodation chamber, a terminal fitting to be inserted into the terminal accommodation chamber from behind the housing, and a locking lance arranged to face the terminal accommodation chamber, the locking lance retaining the terminal fitting in the terminal accommodation chamber, both front and rear end parts of the locking lance being connected to the housing, and a front end supporting portion for supporting the front end part of the locking lance being located forward of a foremost end of the locking lance.

Effect of the Invention

According to the present disclosure, it is possible to improve the stiffness of a locking lance and prevent the deformation of the locking lance.

DETAILED DESCRIPTION TO EXECUTE THE INVENTION

Description of Embodiments of Present Disclosure

Figure 1:
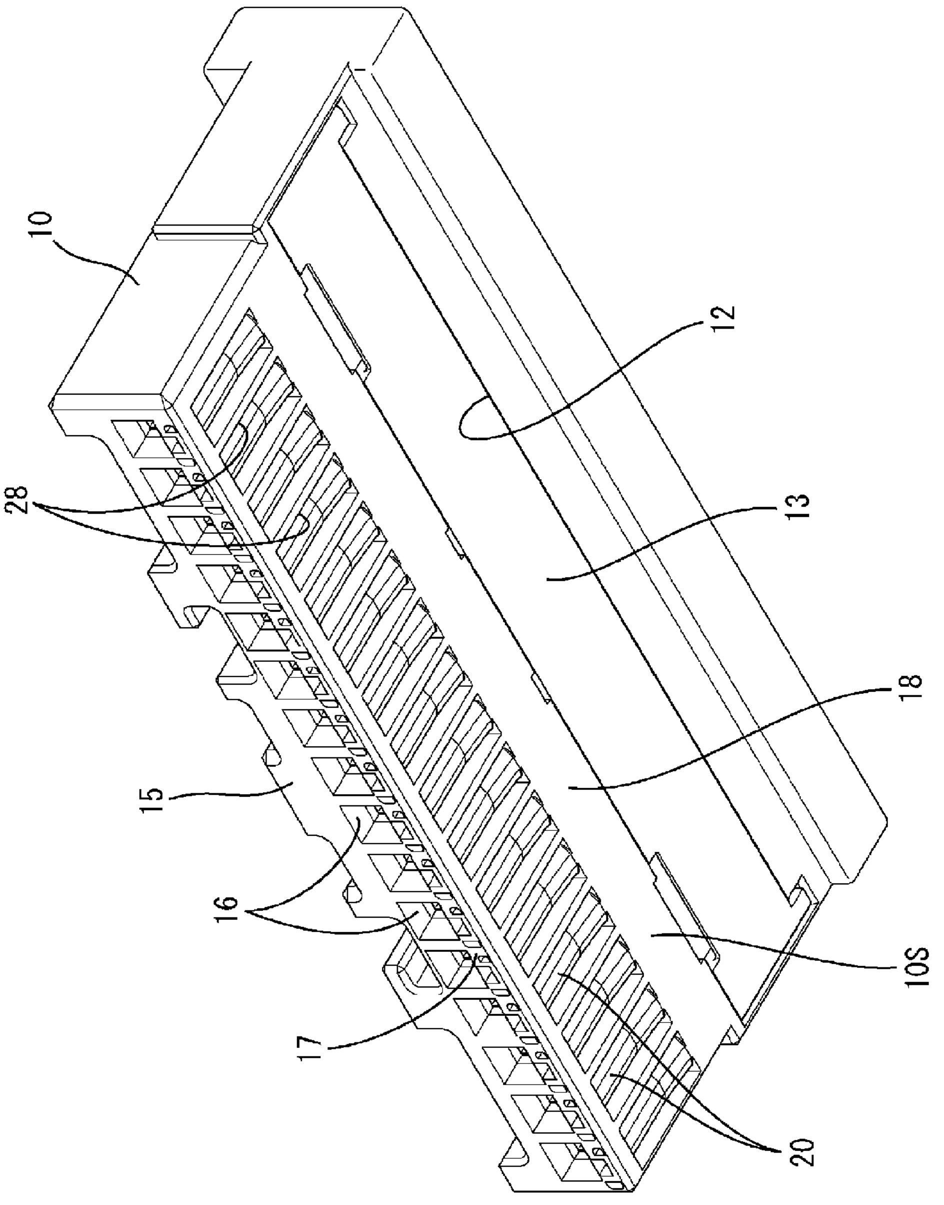
FIG. 1 is a perspective view of a connector of one embodiment when viewed obliquely from a lower front side.

First, embodiments of the present disclosure are listed and described.

(1) The connector of the present disclosure is provided with a housing including a terminal accommodation chamber, a terminal fitting to be inserted into the terminal accommodation chamber from behind the housing, and a locking lance arranged to face the terminal accommodation chamber, the locking lance retaining the terminal fitting in the terminal accommodation chamber, both front and rear end parts of the locking lance being connected to the housing, and a front end supporting portion for supporting the front end part of the locking lance being located forward of a foremost end of the locking lance. According to the configuration of the present disclosure, since the both front and rear end parts of the locking lance are supported by the housing, the deflection stiffness of the locking lance is high. Since the front end supporting portion is present in front of the locking lance, even if an external matter approaches from the front of the housing, there is no possibility that the external matter interferes with the locking lance. Thus, it is possible to improve the stiffness of the locking lance and prevent the deformation of the locking lance.

(2) Preferably, a retaining portion to be locked to the terminal fitting is formed in a region of the locking lance behind the foremost end, and the foremost end of the locking lance is connected to the front end supporting portion. According to this configuration, when the locking of the terminal fitting by the locking lance is released, the locking lance is displaced by pressing a part of the locking lance closer to the foremost end than the retaining portion by a releasing jig inserted from front. At this time, since the locking lance is inclined with the foremost end of the locking lance as a fulcrum, a displacement amount of the retaining portion is larger than a displacement amount of the part of the locking lance pressed by the jig. In this way, the retaining portion can be reliably disengaged from the terminal fitting.

(3) Preferably, the front end part of the locking lance includes a plate-like portion having a plate thickness direction oriented in a resilient deflection direction of the locking lance and a pair of wall-like portions rising from both side edges of the plate-like portion. According to this configuration, since the front end part of the locking lance is U-shaped by including the plate-like portion and the pair of wall-like portions, stiffness is high. Therefore, the reliability of a retaining function of the locking lance is excellent.

(4) Preferably in (3), a foremost end of the plate-like portion and those of the wall-like portions are connected to the front end supporting portion. According to this configuration, since the plate-like portion and the pair of wall-like portions forming a U shape are connected to the front end supporting portion, it is difficult to relatively displace the front end part of the locking lance with respect to the front end supporting portion. Therefore, the reliability of the retaining function of the locking lance is excellent.

(5) Preferably, an outer wall surface of the housing is formed with an opening for exposing an outer surface of the locking lance on a side opposite to the terminal accommodation chamber, and the locking lance is displaceable into the opening due to interference with the terminal fitting in an insertion process of the terminal fitting into the terminal accommodation chamber. According to this configuration, since an outer wall portion for covering a deflection allowing space for the locking lance is not necessary, the housing can be reduced in size in a deflection direction of the locking lance.

(6) Preferably in (5), the outer surface of the locking lance is located inwardly of the outer wall surface of the housing in a state where the locking lance is not resiliently deformed. According to this configuration, the interference of an external matter with the locking lance can be prevented.

(7) Preferably in (6), a distance between the outer wall surface of the housing and the outer surface of the locking lance in a resilient deflection direction of the locking lance is set to be smaller than a resilient deflection amount of the locking lance in the insertion process of the terminal fitting into the terminal accommodation chamber. According to this configuration, the locking lance projects further outward than the outer wall surface of the housing when the locking lance is resiliently deflected. Since a part of the deflection allowing space for the locking lance is secured outside the housing, the housing can be reduced in size as compared to the case where the locking lance does not project to the outer wall surface of the housing in the insertion process of the terminal fitting.

DETAILS OF EMBODIMENT OF PRESENT DISCLOSURE

Embodiment

Figure 2:
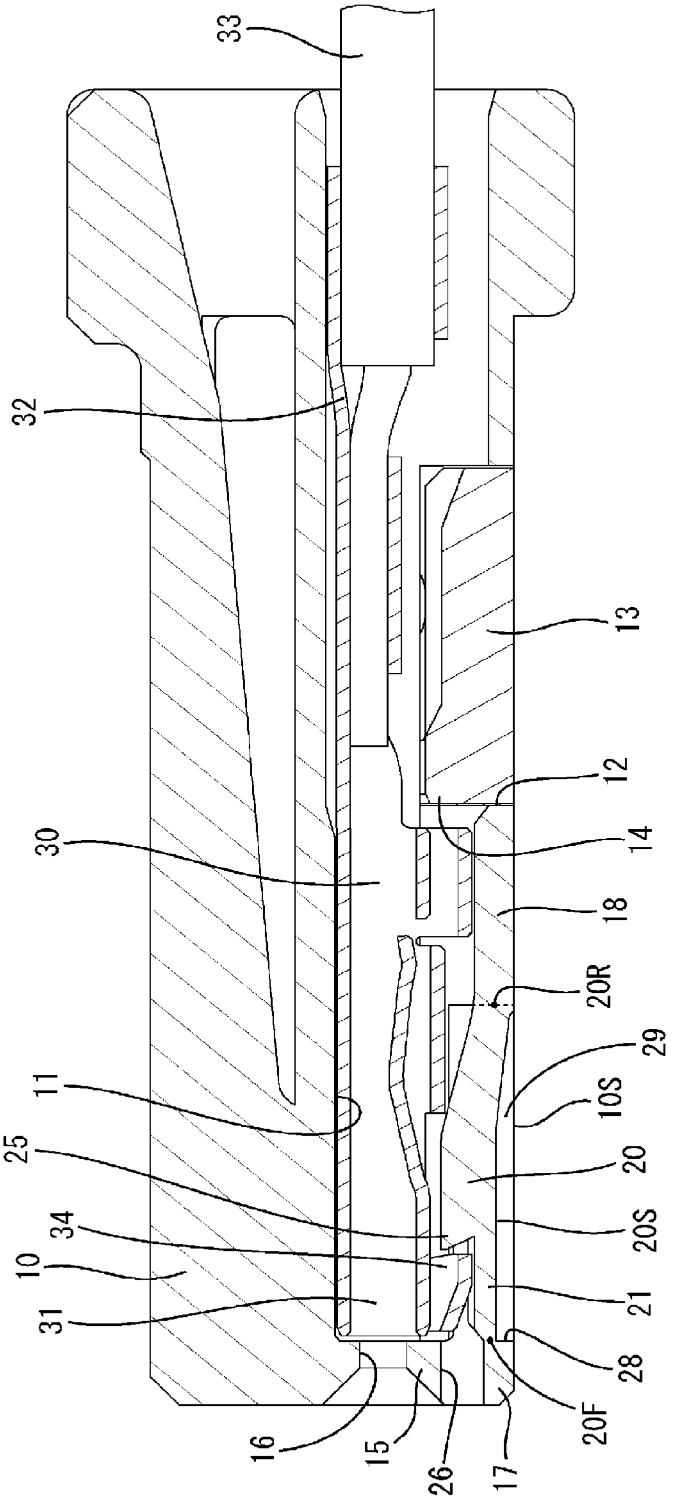
FIG. 2 is a side view in section of the connector.
Figure 3:
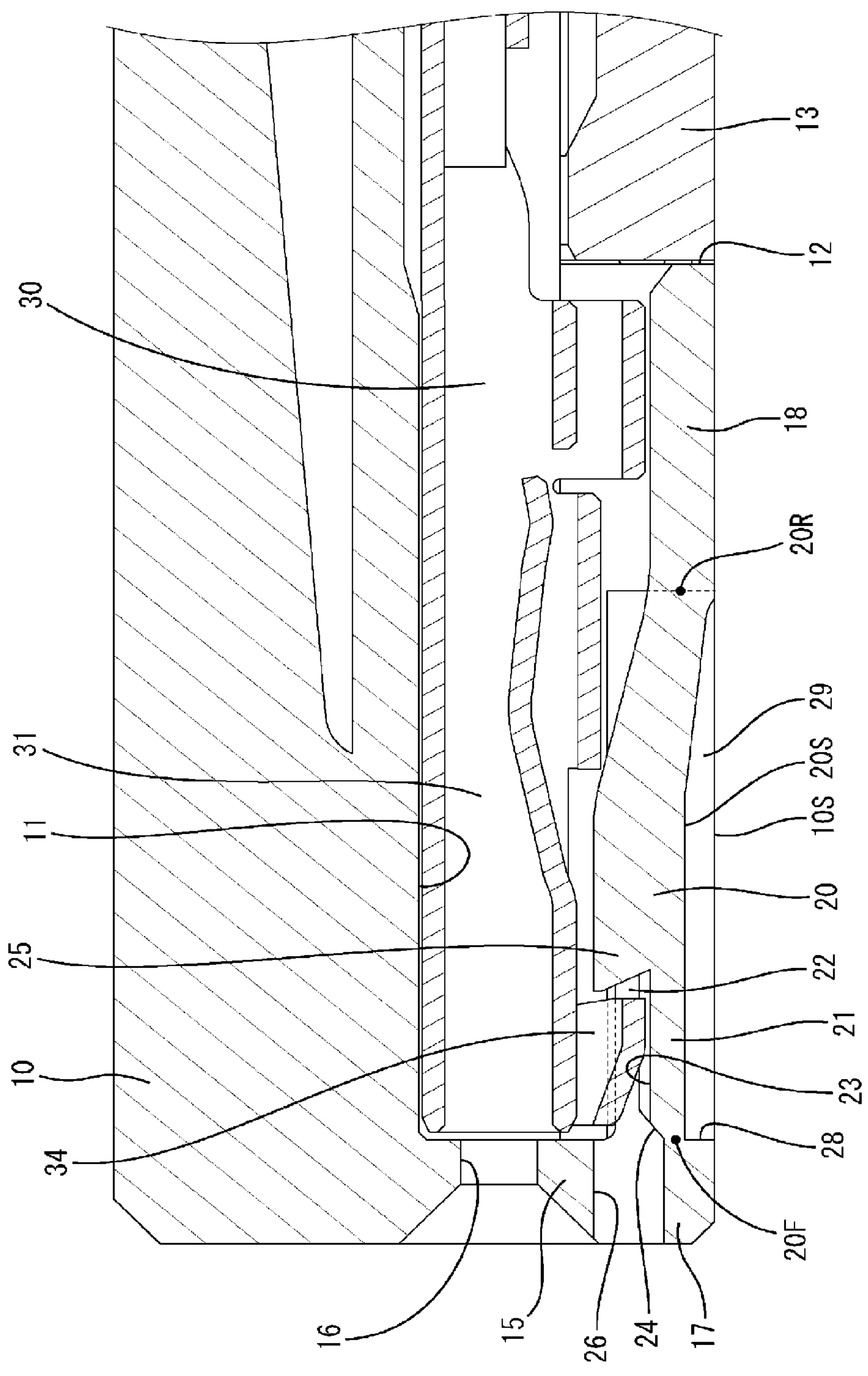
FIG. 3 is a partial enlarged section of FIG. 2.
Figure 4:
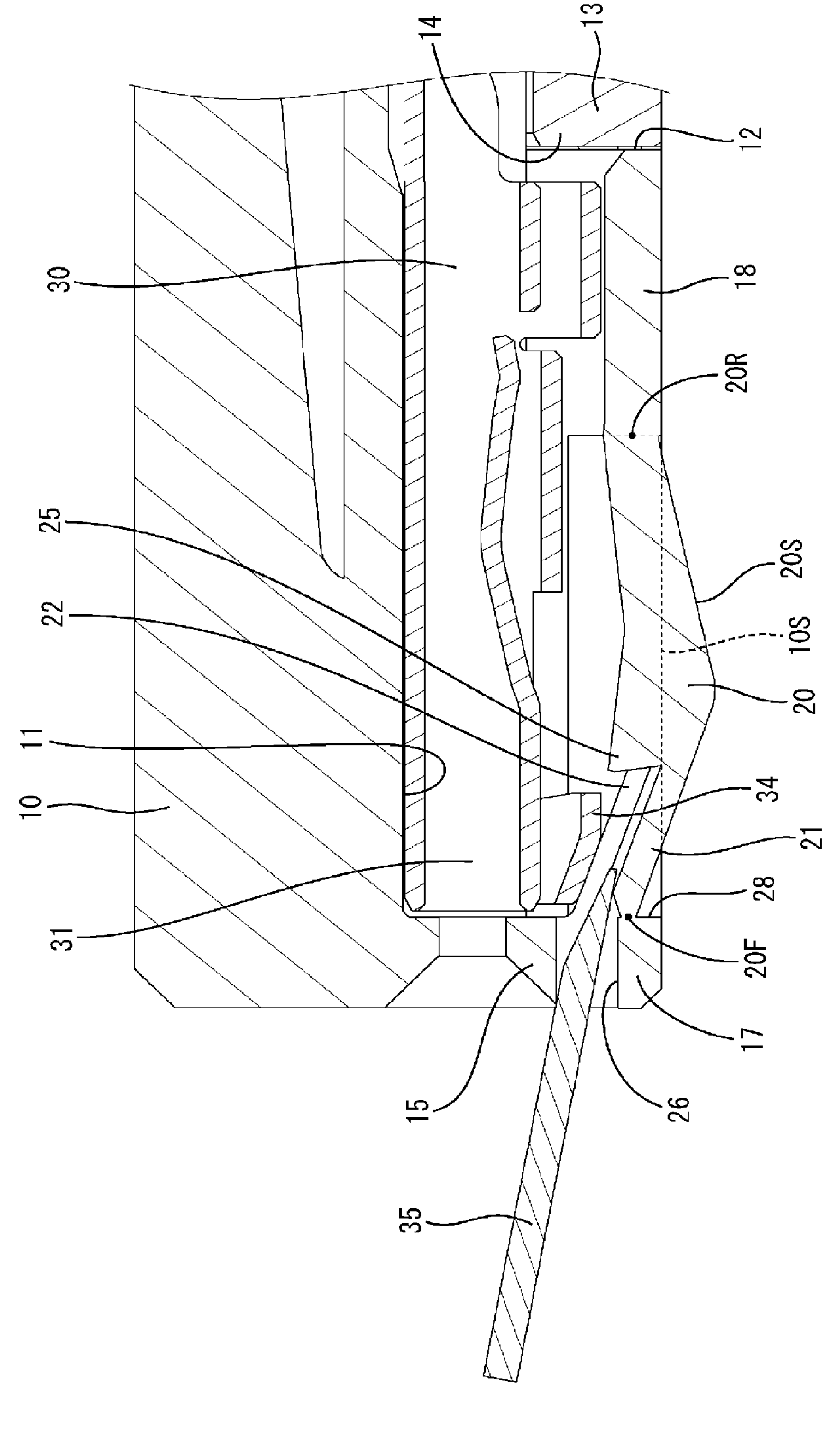
FIG. 4 is a partial enlarged side view in section showing a state where retention by a locking lance is released by a releasing jig.
Figure 5:
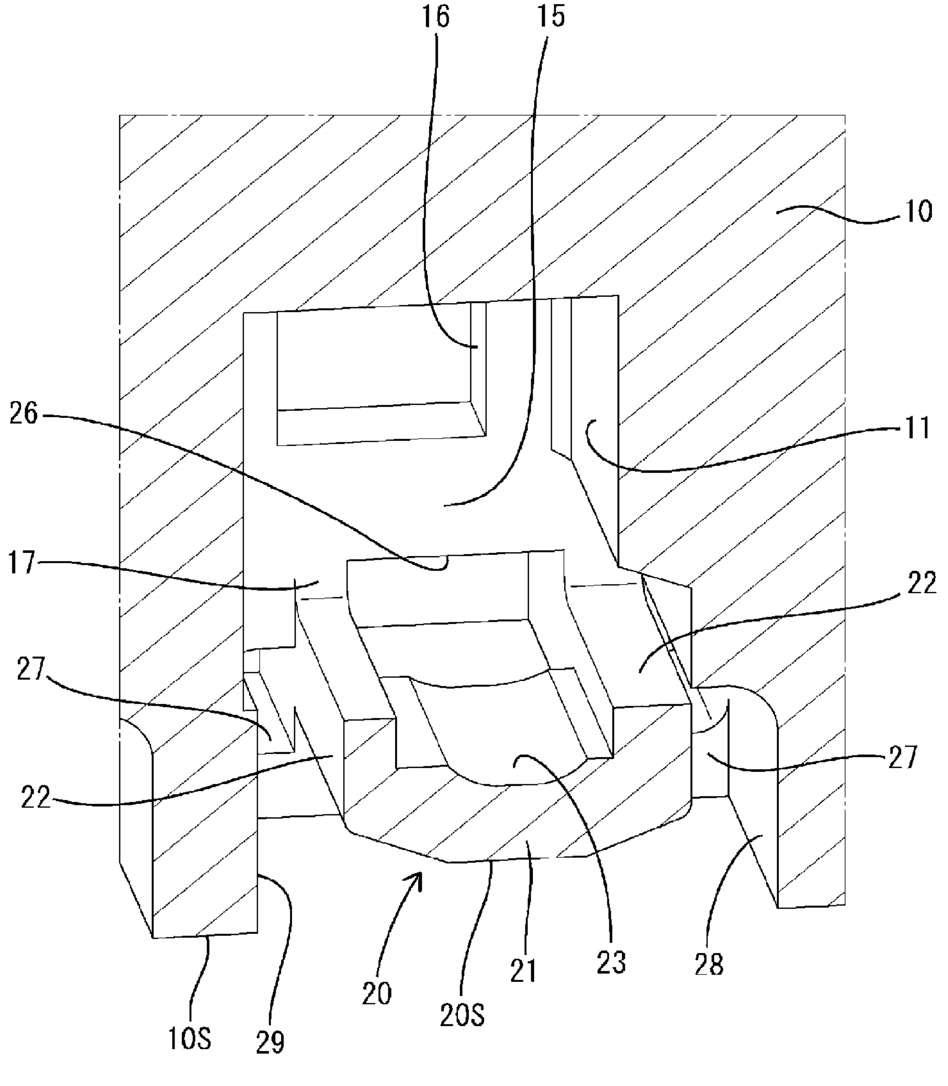
FIG. 5 is a perspective view partly in section showing the shape of a front end part of the locking lance.

One specific embodiment of the present disclosure is described with reference to FIGS. 1 to 5. Note that the present invention is not limited to these illustrations, but is represented by claims and intended to include all changes in the scope of claims and in the meaning and scope of equivalents. In this embodiment, an oblique left upper side in FIGS. 1 and 5 and a left side in FIGS. 2 to 4 are defined as a front side concerning a front-rear direction. Upper and lower sides shown in FIGS. 1 to 5 are directly defined as upper and lower sides concerning a vertical direction.

A connector of this embodiment is provided with a housing 10, a retainer 13 and a plurality of terminal fittings 30. The housing 10 is a single component made of resin and having a flat rectangular parallelepiped shape. A plurality of terminal accommodation chambers 11 elongated in the front-rear direction are formed in parallel in a lateral direction in the housing 10. The terminal fitting 30 is inserted into each terminal accommodation chamber 11 from behind the housing 10. The terminal fitting 30 has a shape elongated in the front-rear direction as a whole. A terminal body portion 31 in the form of a rectangular tube is formed in a front end part of the terminal fitting 30. A crimping portion 32 in the form of an open barrel is formed in a rear end part of the terminal fitting 30. The crimping portion 32 is fixed to a front end part of a wire 33.

The housing 10 is formed with one accommodation space 12 communicating with the plurality of terminal accommodation chambers 11. The retainer 13 for retaining the terminal fittings 30 in the terminal accommodation chambers 11 is mounted into the accommodation space 12. The retainer 13 includes a locking portion 14, which faces and is lockable to the terminal body portions 31 from behind.

The front ends of the plurality of terminal accommodation chambers 11 are defined by a front wall portion 15 of the housing 10. The front wall portion 15 is formed with tab insertion holes 16 communicating with the inside of each terminal accommodation chamber 11 from the front surface of the housing 10. A tab of a mating terminal (not shown) is inserted into the tab insertion hole 16 from the front of the housing 10. Out of the front wall portion 15, U-shaped regions below the tab insertion holes 16 function as front end supporting portions 17.

The lower surfaces of the plurality of terminal accommodation chambers 11 are defined by a lower wall portion 18 of the housing 10. The lower wall portion 18 is a part constituting an outer wall of the housing 10. The lower surface of the lower wall portion 18 is an outer wall surface 10S facing an outside space of the housing 10. A front end part of the lower wall portion 18 is integrally formed with a plurality of locking lances 20. The plurality of locking lances 20 are arranged to individually face the plurality of terminal accommodation chambers 11. The locking lance 20 has a shape elongated in the front-rear direction along the terminal accommodation chamber 11. A rearmost end 20R of the locking lance 20 is directly connected to the lower wall portion 18.

The front end part of the locking lance 20 is composed of a plate-like portion 21 parallel to the outer wall surface 10S and a pair of left and right wall-like portions 22. The pair of wall-like portions 22 are in the form of ribs projecting upward, i.e. toward the terminal accommodation chamber 11, from both left and right side edges of the plate-like portion 21. In a cross-section cut perpendicular to a length direction of the locking lance 20, the front end part of the locking lance 20 is U-shaped. The plate-like portion 21 is formed with a curved surface 23 by arcuately recessing the upper surface of the plate-like portion 21. A guiding surface 24 inclined to be lower toward the front is formed on a front end part of the upper surface of the plate-like portion 21.

A foremost end 20F, which is a foremost part of the locking lance 20, is directly connected to the rear surface of the front end supporting portion 17. The plate-like portion 21 projects perpendicularly rearward from the front end supporting portion 17, and the wall-like portions 22 also project perpendicularly rearward from the front end supporting portion 17. The lower wall portion 18 of the housing 10 and the front wall portion 15 including the front end supporting portions 17 are both parts constituting a body of the housing 10, and high in stiffness. Both front and rear end parts of the locking lance 20 are directly connected to these front end supporting portion 17 and lower wall portion 18 having a high stiffness. The locking lance 20 can be resiliently deformed to be curved in the vertical direction with the foremost end 20F and the rearmost end 20R thereof as fulcrums. A resilient displacement direction of the locking lance 20 is a direction intersecting an insertion direction of the terminal fitting 30 into the terminal accommodation chamber 11.

A projection-like retaining portion 25 is formed on the upper surface of the locking lance 20, i.e. on a surface facing the terminal accommodation chamber 11. The retaining portion 25 holds the terminal fitting 30 in a retained state by locking the terminal fitting 30 in the terminal accommodation chamber 11. The retaining portion 25 is arranged behind the foremost end 20F of the locking lance 20 and connected to the rear end of the plate-like portion 21 and the rear ends of the wall-like portions 22. A first mold removal space 26 communicating with the front surface of the housing 10 is formed in front of the retaining portion 25. A pair of left and right second mold removal spaces 27 communicating with the front surface of the housing 10 are formed to both the left and right of the locking lance 20.

The outer wall surface 10S, i.e. the lower surface, of the housing 10 is formed with a plurality of openings 28. The plurality of openings 28 are shaped by individually cutting regions including the plurality of locking lances 20. In the opening 28, the lower surface of the locking lance 20, i.e. the entire region of an outer surface 20S of the locking lance 20 on a side opposite to the terminal accommodation chamber 11, is exposed to the outer wall surface 10S of the housing 10. The opening 28 communicates with the pair of left and right second mold removal spaces 27.

In a state where the locking lance 20 is not resiliently deformed, the outer surface 20S of the locking lance 20 is located to the back of the outer wall surface 10S of the housing, i.e. inside the opening 28. A third mold removal space 29 is formed on a side closer to the outer wall surface 10S of the housing 10 than the outer surface 20S of the locking lance 20, out of the inside of the opening 28. The third mold removal space 29 constitutes a part of a deflection allowing space for allowing a resilient displacement of the locking lance 20. In the resilient displacement direction of the locking lance 20, a height difference between the outer surface 20S of the locking lance 20 and the outer wall surface 10S of the housing 10 is set to be smaller than a projecting dimension of the retaining portion 25 from the upper surface of the plate-like portion 21.

In the process of inserting the terminal fitting 30 into the terminal accommodation chamber 11, a locking projection 34 of the terminal body portion 31 interferes with the retaining portion 25, whereby the locking lance 20 is resiliently displaced downward, i.e. in a direction away from the terminal fitting 30. At this time, the locking lance 20 is curved and deformed to bulge downward with both front and rear end parts of the locking lance 20 as fulcrums. If the terminal fitting 30 is inserted to a proper position in the terminal accommodation chamber 11, the locking lance 20 resiliently returns upward and the retaining portion 25 is located to face the locking projection 34 in a lockable state from behind. In this way, the terminal fitting 30 is held in a retained state by the locking lance 20. Since the both front and rear end parts of the locking lance 20 are supported by the housing 10, the locking lance 20 is high in stiffness. Therefore, a holding force for holding the terminal fitting 30 by the locking lance 20 is large.

In pulling out the terminal fitting 30 from the terminal accommodation chamber 11, a releasing jig 35 is inserted into the first mold removal space 26 from the front of the housing 10 and the tip of the releasing jig 35 is pressed on the upper surface of the plate-like portion 21, out of the front end part of the locking lance 20, as shown in FIG. 4. At this time, the tip of the releasing jig 35 is in contact with the front end part of the locking lance 20 at a position behind the foremost end 20F of the locking lance 20 and in front of the retaining portion 25. If the locking lance 20 is pushed up by a leverage action by the releasing jig 35, the locking lance 20 is resiliently displaced downward while being curved and deformed and the retaining portion 25 is disengaged from the locking projection 34 as during the insertion of the terminal fitting 30. If the wire 33 is gripped and pulled rearward in this state, the terminal fitting 30 can be pulled out from the terminal accommodation chamber 11.

The connector of this embodiment is provided with the housing 10 including the terminal accommodation chambers 11 and the terminal fittings 30 to be inserted into the terminal accommodation chambers 11 from behind the housing 10. The housing 10 includes the locking lances 20 arranged to face the terminal accommodation chambers 11 and retain the terminal fittings 30 in the terminal accommodation chambers 11. The foremost end 20F and the rearmost end 20R of the locking lance 20 are directly connected to the housing 10. The front end supporting portion 17 supporting the front end part of the locking lance 20 is located forward of the foremost end 20F of the locking lance 20.

Since the both front and rear end parts of the locking lance 20 are supported by the housing 10, the deflection stiffness of the locking lance 20 is high. The foremost end 20F of the locking lance 20 is at a position near the front surface of the housing 10, and facing the outside of the housing 10 in the first mold removal space 26. However, since the front end supporting portions 17 and the front wall portion 15 are present in front of the locking lances 20, even if an external matter approaches from the front of the housing 10, there is no possibility that the external matter interferes with the locking lances 20. The connector of this embodiment can improve the stiffness of the locking lance 20 and prevent the deformation of the locking lance 20.

The retaining portion 25 to be locked to the terminal fitting 30 is formed in a region of the locking lance 20 behind the foremost end 20F of the locking lance 20. The foremost end 20F of the locking lance 20 is connected to the front end supporting portion 17. When the locking of the terminal fitting 30 by the locking lance 20 is released, a part of the locking lance 20 closer to the foremost end 20F than the retaining portion 25 is pushed to displace the locking lance 20 by the releasing jig 35 inserted from front. At this time, since the locking lance 20 is inclined with the foremost end 20F of the locking lance 20 as a fulcrum, a displacement amount of the retaining portion 25 is larger than that of the part of the locking lance 20 pressed by the releasing jig 35. In this way, even if an operation amount of the releasing jig 35 is small, the retaining portion 25 can be reliably disengaged from the terminal fitting 30.

The front end part of the locking lance 20 includes the plate-like portion 21 having the plate thickness direction oriented in the resilient deflection direction of the locking lance 20 and the pair of wall-like portions 22 rising from both side edges of the plate-like portion 21. Since the front end part of the locking lance 20 is U-shaped by including the plate-like portion 21 and the pair of wall-like portions 22, stiffness is high. Therefore, the reliability of a retaining function of the locking lance 20 is excellent. The U-shaped foremost end 20F composed of the plate-like portion 21 and the pair of wall-like portions 22 is connected to the front end supporting portion 17. In this way, it is difficult to relatively displace the front end part of the locking lance 20 with respect to the front end supporting portion 17. Therefore, the reliability of the retaining function of the locking lance 20 is excellent.

The outer wall surface 10S of the housing 10 is formed with the openings 28 for exposing the outer surfaces 20S of the locking lances 20 on the side opposite to the terminal accommodation chambers 11. In the insertion process of the terminal fitting 30 into the terminal accommodation chamber 11, the locking lance 20 is displaceable into the opening 28, i.e. into the third mold removal space 29, due to interference with the terminal fitting 30. According to this configuration, since an outer wall portion for covering the deflection allowing spaces for the locking lances 20 is not necessary, the housing 10 can be reduced in size in the deflection direction of the locking lances 20. In a state where the locking lance 20 is not resiliently deformed, the outer surface 20S of the locking lance 20 is located inwardly of the outer wall surface 10S of the housing 10, wherefore the interference of an external matter with the outer surface 20S of the locking lance 20 can be prevented.

A distance between the outer wall surface 10S of the housing 10 and the outer surface 20S of the locking lance 20 in the resilient deflection direction of the locking lance 20 is set to be smaller than a resilient deflection amount of the locking lance 20 in the insertion process of the terminal fitting 30 into the terminal accommodation chamber 11. When the locking lance 20 is resiliently deflected, the locking lance 20 projects further outward than the outer wall surface 10S of the housing 10. A part of the deflection allowing space for the locking lance 20 is secured by the outside space of the housing 10, i.e. a space outwardly of the outer wall surface 10S. In the connector of this embodiment, the housing 10 can be reduced in size as compared to the case where the locking lance 20 does not project to the outer wall surface 10S of the housing 10 in the insertion process of the terminal fitting 30.

OTHER EMBODIMENTS

The present invention is not limited to the above described and illustrated embodiment, but is represented by claims. The present invention is intended to include all changes in the scope of claims and in the meaning and scope of equivalents and also include the following embodiments.

Although the front end part of the locking lance is U-shaped in the above embodiment, the front end part of the locking lance may be flat plate-like.

Although the deflection allowing space for the locking lance is exposed to the outer surface of the housing in the above embodiment, the deflection allowing space for the locking lance may be covered by the outer wall portion of the housing.

Although the outer surface of the locking lance is located inwardly of the outer wall surface of the housing in the above embodiment, the outer surface of the locking lance may be arranged to be flush with the outer wall surface of the housing.

Although the distance between the outer wall surface of the housing and the outer surface of the locking lance in the resilient deflection direction of the locking lance is set to be smaller than the resilient deflection amount of the locking lance in the insertion process of the terminal fitting into the terminal accommodation chamber in the above embodiment, the distance between the outer wall surface of the housing and the outer surface of the locking lance may be equal to or larger than the resilient deflection amount of the locking lance.

LIST OF REFERENCE NUMERALS

10 . . . housing
10S . . . outer wall surface of housing
11 . . . terminal accommodation chamber
12 . . . accommodation space
13 . . . retainer
14 . . . locking portion
15 . . . front wall portion
16 . . . tab insertion hole
17 . . . front end supporting portion
18 . . . lower wall portion
20 . . . locking lance
20F . . . foremost end of locking lance
20R . . . rearmost end of locking lance
20S . . . outer surface
21 . . . plate-like portion
22 . . . wall-like portion
23 . . . curved surface
24 . . . guiding surface
25 . . . retaining portion
26 . . . first mold removal space
27 . . . second mold removal space
28 . . . opening
29 . . . third mold removal space
30 . . . terminal fitting
31 . . . terminal body portion
32 . . . crimping portion
33 . . . wire
34 . . . locking projection
35 . . . releasing jig

What is claimed is:

1. A connector, comprising:
a housing including a terminal accommodation chamber;
a terminal fitting to be inserted into the terminal accommodation chamber from behind the housing; and
a locking lance for retaining the terminal fitting in the terminal accommodation chamber, the locking lance including
a front end part that includes a foremost end connected to a front end supporting portion of the housing, the front end supporting portion supporting the front end part and being located forward of the foremost end, and
a rear end part that includes a rearmost end connected to a lower wall portion of the housing,
the front end part of the locking lance including a plate-like portion having a plate thickness direction oriented in a resilient deflection direction of the locking lance and a pair of wall-like portions in the form of ribs rising from both side edges of the plate-like portion, and
the front end part of the locking lance having a U-shape constituted by the plate-like portion and the pair of wall-like portions, the U-shape having an open side facing the terminal accommodation chamber.

2. The connector of claim 1, wherein:
a retaining portion to be locked to the terminal fitting is formed in a region of the locking lance behind the foremost end.

3. The connector of claim 1, wherein a foremost end of the plate-like portion and those of the wall-like portions are connected to the front end supporting portion.

4. The connector of claim 1, wherein:
an outer wall surface of the housing is formed with an opening for exposing an outer surface of the locking lance on a side opposite to the terminal accommodation chamber, and
the locking lance is displaceable into the opening due to interference with the terminal fitting in an insertion process of the terminal fitting into the terminal accommodation chamber.

5. The connector of claim 4, wherein the outer surface of the locking lance is located inwardly of the outer wall surface of the housing in a state where the locking lance is not resiliently deformed.

6. The connector of claim 5, wherein a distance between the outer wall surface of the housing and the outer surface of the locking lance in a resilient deflection direction of the locking lance is set to be smaller than a resilient deflection amount of the locking lance in the insertion process of the terminal fitting into the terminal accommodation chamber.

* * * * *